United States Patent
Doepke

(10) Patent No.: US 9,324,376 B2
(45) Date of Patent: Apr. 26, 2016

(54) TIME-LAPSE VIDEO CAPTURE WITH TEMPORAL POINTS OF INTEREST

(71) Applicant: Apple Inc., Cupertino, CA (US)

(72) Inventor: Frank Doepke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 14/502,675

(22) Filed: Sep. 30, 2014

(65) Prior Publication Data

US 2016/0093335 A1    Mar. 31, 2016

(51) Int. Cl.
| H04N 5/77 | (2006.01) |
| H04N 5/91 | (2006.01) |
| G11B 27/10 | (2006.01) |
| H04N 1/21 | (2006.01) |
| H04N 1/32 | (2006.01) |

(52) U.S. Cl.
CPC ............... *G11B 27/10* (2013.01); *H04N 1/212* (2013.01); *H04N 1/2133* (2013.01); *H04N 5/77* (2013.01); *H04N 5/91* (2013.01); *H04N 1/32267* (2013.01)

(58) Field of Classification Search
CPC . H04N 1/2133; H04N 1/00297; H04N 1/212; H04N 1/32267; H04N 5/77; H04N 5/91; G11B 27/10
USPC ................................................ 348/222.1, 259
See application file for complete search history.

(56) References Cited

U.S. PATENT DOCUMENTS

| 5,867,214 A | 2/1999 | Anderson | |
| 6,636,220 B1 * | 10/2003 | Szeliski | G06T 13/80 345/475 |
| 6,665,342 B1 | 12/2003 | Brown | |
| 7,295,230 B2 | 11/2007 | Takahashi | |
| 7,499,588 B2 | 3/2009 | Jacobs | |
| 7,880,936 B2 * | 2/2011 | Shiiyama | G06F 17/30843 348/700 |
| 7,990,430 B2 | 8/2011 | Okamoto | |
| 8,118,216 B2 | 2/2012 | Hoch | |
| 8,711,495 B2 | 4/2014 | Topliss | |
| 2007/0189728 A1 | 8/2007 | Yu | |
| 2009/0222163 A1 * | 9/2009 | Plante | H04N 21/23406 701/33.4 |
| 2011/0243453 A1 * | 10/2011 | Kashima | G06F 17/30256 382/195 |
| 2012/0257071 A1 | 10/2012 | Prentice | |
| 2013/0063584 A1 | 3/2013 | Nakasho | |

(Continued)

FOREIGN PATENT DOCUMENTS

| EP | 1557837 A1 | 7/2005 |
| JP | 2002135724 A | 5/2002 |

*Primary Examiner* — Hung Lam
(74) *Attorney, Agent, or Firm* — Blank Rome LLP

(57) ABSTRACT

Traditionally, time-lapse videos are constructed from images captured at given time intervals called "temporal points of interests" or "temporal POIs." Disclosed herein are intelligent systems and methods of capturing and selecting better images around temporal points of interest for the construction of improved time-lapse videos. According to some embodiments, a small "burst" of images may be captured, centered around the aforementioned temporal points of interest. Then, each burst sequence of images may be analyzed, e.g., by performing a similarity comparison between each image in the burst sequence and the image selected at the previous temporal point of interest. Selecting the image from a given burst that is most similar to the previous selected image allows the intelligent systems and methods described herein to improve the quality of the resultant time-lapse video by discarding "outlier" or other undesirable images captured in the burst sequence around a particular temporal point of interest.

20 Claims, 7 Drawing Sheets

(56) References Cited

U.S. PATENT DOCUMENTS

| | | | |
|---|---|---|---|
| 2013/0071031 A1* | 3/2013 | Huang | G06K 9/46 382/190 |
| 2013/0202185 A1 | 8/2013 | Irwin | |
| 2013/0215289 A1 | 8/2013 | Vitsnudel | |
| 2013/0336590 A1* | 12/2013 | Sentinelli | H04N 5/772 382/218 |
| 2014/0052636 A1 | 2/2014 | Mattes | |
| 2014/0085495 A1 | 3/2014 | Almalki | |
| 2014/0105564 A1 | 4/2014 | Johar | |
| 2014/0285718 A1 | 9/2014 | Murakami | |

* cited by examiner

TIME-LAPSE VIDEO CAPTURE WITH TEMPORAL POINTS OF INTEREST

BACKGROUND

This disclosure relates generally to the field of video capture, and more particularly, to acquiring time-lapse video.

The advent of portable integrated computing devices has caused a wide proliferation of cameras and video devices. These integrated computing devices commonly take the form of smartphones or tablets and typically include general purpose computers, cameras, sophisticated user interfaces including touch sensitive screens, and wireless communications abilities through Wi-Fi, LTE, HSDPA and other cell-based or wireless technologies. The wide proliferation of these integrated devices provides opportunities to use the devices' capabilities to perform tasks that would otherwise require dedicated hardware and software. For example, as noted above, integrated devices such as smartphones and tablets typically have one or two embedded cameras. These cameras generally amount to lens/camera hardware modules that may be controlled through the general purpose computer using firmware and/or software (e.g., "Apps") and a user interface including the touch-screen fixed buttons and touch-less control such as voice control.

The integration of cameras into communication devices such as smartphones and tablets has enabled people to share images and videos in ways never before possible. It is now very popular to acquire and immediately share photos with other people either by sending the photos via text message, SMS, or email, or by uploading the photos to an Internet-based service, such as a social networking site or a photo sharing site.

Immediately sharing video is likewise possible, as described above for sharing of photos. However, bandwidth limitations and upload times significantly constrain the length of video that can easily be shared. In many instances, a short video clip that captures the essence of the entire action recorded may be desirable. The duration of the video clip may depend on the subject matter of the video clip. For example, a several hour car ride or an evening at a party might be reduced to a time-lapse video clip lasting only a minute or two. Other action, such as a sunset or the movement of clouds, might be better expressed in a clip of twenty to forty seconds. While a time-lapse video of shortened duration may be desired, a user often may wish to acquire video (referred to herein as, "source video") over a greater length of time, for example, over minutes, hours, or even days. A user may desire to reduce the length of the source video to provide a shortened, time-lapse video clip. The user may wish to share the video, as mentioned above, or, may simply desire shortened, time-lapse playback.

SUMMARY

Traditionally, time-lapse videos are constructed from image frames captured at given time intervals, e.g., an individual image frame captured every ten seconds. These capture times are referred to herein as, "temporal points of interests" or "temporal POIs." The frames used to construct the time-lapse videos are single image frame captures. Disclosed herein are intelligent systems and methods of capturing and selecting better images around temporal points of interest for the construction of improved time-lapse videos. According to some embodiments, a small "burst" of frames may be captured, centered around the aforementioned temporal points of interest. Then, each burst sequence of image frames may be analyzed, e.g., by performing a similarity comparison between each image in the burst sequence and the image frame selected at the previous temporal point of interest. Each image frame in the burst sequence may generate a "similarity score." This score may be computed based on various factors, such as color histograms, exposure levels, average luminance, etc. This allows the intelligent systems and methods described herein to detect, e.g., if some object appeared fleetingly in an otherwise still frame at a particular temporal point of interest. If so, the quality of the time-lapse video may be improved by selecting a different image frame from the burst sequence around the particular temporal point of interest for inclusion in the resultant time-lapse video.

In other embodiments, the average brightness of each frame in the burst sequence may be computed and used to filter out image frames from the burst sequence having exposure fluctuations, e.g., because of specular highlights, moving objects, or simply measurement inaccuracies of the camera.

In time-lapse videos of busy scenes, such as railway stations or exhibition halls, not all similarity algorithms will produce a conclusive result—meaning that all of the images in a given burst sequence may show very low similarity scores with the selected image frame from the preceding temporal point of interest. In such a situation, alternative techniques, such as temporal weighting (i.e., biasing the image frame selection process to the image frame that was capture closest in time to the actual temporal point of interest), may be used to determine which image frame to choose for a given temporal point of interest.

In still other embodiments, the "similarity score" concept may also be extended by other quality measurements to enhance the image frame selection process for each burst sequence. As an example, the focus score of each image frame in the burst sequence may be evaluated, in particular for "macro" scenes, where slight subject movements can greatly vary how in-focus—and therefore how sharp—the subject matter of the image frame is.

The amount of time before and after each temporal point of interest that is used for the burst sequence of captured image frames may be correlated to the time interval over which the time-lapse video is captured. A given implementation may thus determine the amount of time it will allow for the burst sequence capture—as a longer time interval may allow for the selection of an image with a better composition of the scene, while a shorter time interval reduces the "temporal accuracy" of the resultant time-lapse video, i.e., the images used to construct the time-lapse video are more likely to be farther away from the calculated temporal point of interest times the longer the time interval around each temporal point of interest is allowed to grow.

The method is adaptive, in that can adapt to changing conditions and compositions of the scene being captured as the capturing continues. Once image frame acquisition has stopped, the "selected" image frames for each temporal point of interest may be encoded into a resultant time-lapse video clip. A further embodiment is an apparatus or device programmed to implement the methods described herein.

DESCRIPTION

Figure 1:
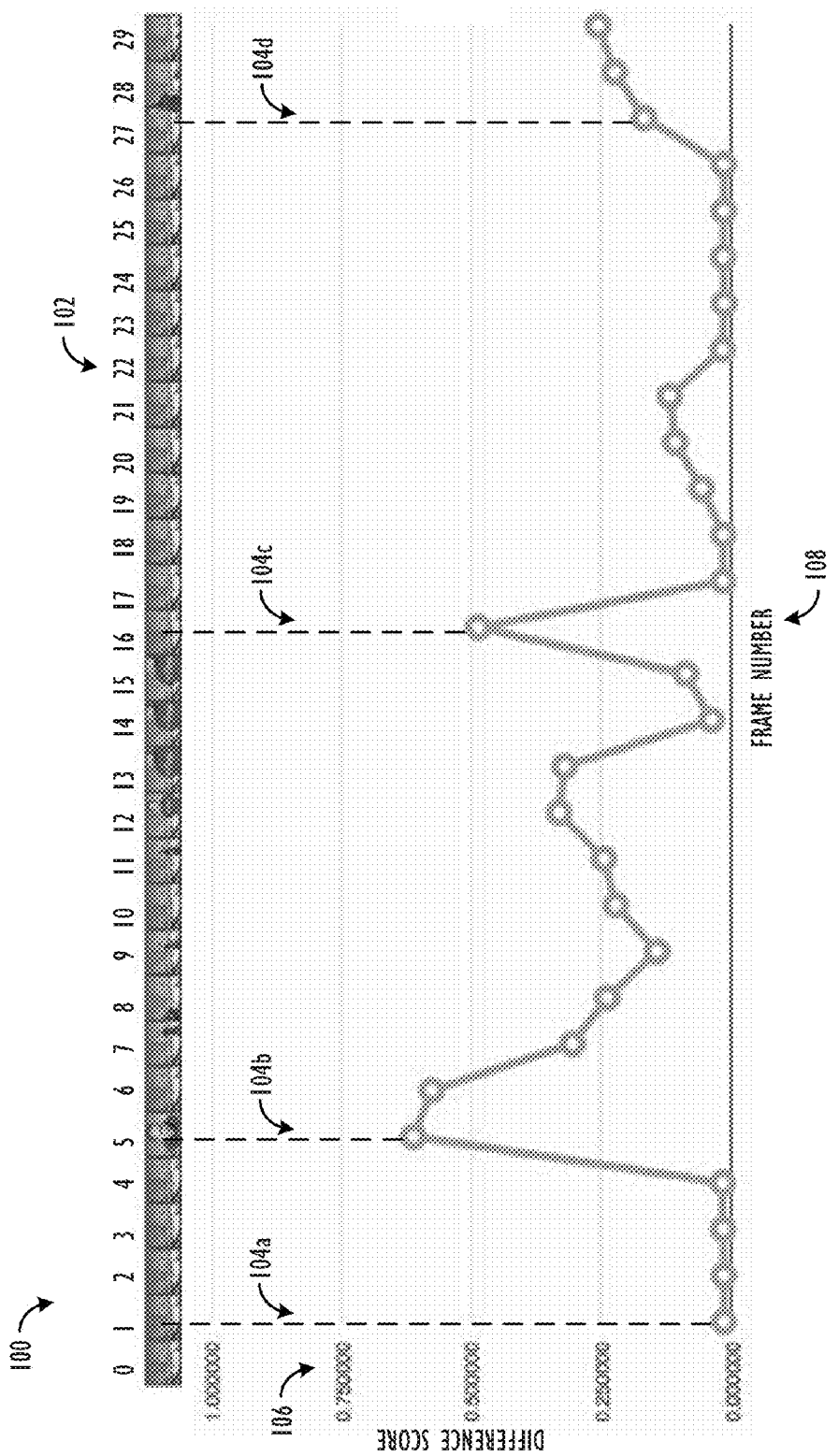
FIG. 1 is a graph illustrating an exemplary difference score, as applied to consecutive frames of a captured image sequence.

Systems, methods and program storage devices are disclosed, which provide instructions to cause one or more cameras and/or processing units to record time-lapse video. The techniques disclosed herein are applicable to any number of electronic devices with displays: such as digital cameras, digital video cameras, mobile phones, personal data assistants (PDAs), portable music players, monitors, and, of course, desktop, laptop, and tablet computer displays.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

Time-lapse reduces the playback time of a video compared to the length of time it took to acquire the video. According to some examples, a resultant time-lapse clip of 20 to 40 seconds may be desired, but it will be appreciated that any duration may be chosen a priori, or adjusted "on-the-fly" during video capture. A method of reducing a 40 second clip of source video to 20 seconds of time-lapse video would be to: (1) acquire source video for 40 seconds at a frame rate of 30 frames-per-second, or "fps," yielding 1200 images total; (2) discard half of the images (for example, discard every other image), yielding 600 images total; and (3) play the remaining 600 images back at 30 fps, yielding 20 seconds of time-lapsed video. Because half of the images are discarded, the acquisition frame rate is "effectively" 15 fps, even though the video was actually acquired at 30 fps. Thus, the term "effective acquisition frame rate" is used herein to refer to the number of images remaining divided by the true acquisition time. When played back at 30 fps, the action in the video will appear to move at twice the speed as the "true-to-life" action. To create 20 seconds of time-lapse video from a longer segment of source video, more images would have to be discarded. For example, 80 seconds of source video recorded at 30 fps would yield 2400 images. Discarding 1800 of those images (i.e., keeping every fourth image) would leave 600 images, again providing 20 seconds of time-lapse video for playback at 30 fps.

As the length of time source video is acquired increases, the number of images that are discarded to yield the time-lapse video increases also, and quickly far exceeds the number of images that are actually used. The acquisition and storage of those unused images consumes processing and storage resources that could otherwise be used for other operations.

An alternative to acquiring and then discarding the used images would be to not acquire them in the first place. For example, if the user acquired 40 seconds of source video at an acquisition frame rate of 15 fps (the same as the "effective frame rate" in the above example) instead of 30 fps, then they would collect a total of 600 images. Playing back those 600 images at 30 fps would yield 20 seconds of time-lapse video. Likewise, the user could collect 80 seconds of source video at a rate of 7.5 fps to yield 600 images that could be played back at 30 fps to provide 20 seconds of time-lapse video.

One problem with such an alternative method is that the device implementing such a method must calculate precise "temporal points of interest" at which it will capture the images that are to be used in the resultant assembled time-lapse video. For example, in the example above of capturing a video at 30 fps, there would be an image captured every 33 ms (i.e., 1000 ms/30 frames=33 ms/frame). If an effective frame rate of 15 fps were desired in the resultant time lapse video, then every other frame could be discarded. In other words, assuming that time begins at t=0 ms, there will be temporal points of interest (and thus, images selected) every 66 ms (33 ms×2, for every other frame), i.e., at $t_1$=66 ms, $t_2$=132 ms, $t_3$=199 ms, and so forth. For longer acquired video sequences, the temporal points of interest may actually be multiple seconds, minutes—or even hours—apart. For example, in the illustrative embodiments described herein, we will assume an acquisition frame rate of 15 fps, and that the temporal points of interest occur at 1 second intervals. In other words, it is desired to only use a single frame in the resultant time-lapse video from every 15 frames that are captured, and there will be temporal points of interest (and thus, images selected) every 1 s, i.e., at $t_1$=1 s, $t_2$=2 s, $t_3$=3 s, and so forth. It is to be understood that different frame rates, effective frame rates, and temporal point of interest intervals may be selected based on the needs of a particular implementation.

In many cases, the exact acquired image captured at a calculated temporal point of interest may be suboptimal. For example, if the user is filming a sunset, a large insect may fly in front of the lens and obscure the captured image at one or more of the temporal points of interest. This can have the effect of greatly changing the camera's exposure settings, adding out of focus frames to the time-lapse video, and generally including image frames in the resultant time-lapse video whose composition do not "tell the story" that the user is likely intending to tell with the time-lapse video.

Hence, described herein is an adaptive algorithm for acquiring and processing time-lapse video that intelligently selects image frames from "burst sequences" of captured images centered around temporal points of interest in an effort to avoid "outlier" image frames or other undesirable images captured in the burst sequence around a particular temporal point of interest.

Referring now to FIG. 1, a graph 100 illustrating an exemplary difference score, as applied to consecutive frames of a hypothetical captured image sequence 102 is shown. The vertical axis 106 of graph 100 represents an exemplary "Difference Score," normalized between the values of 0 and 1. In the exemplary graph 100, the values of the plotted points along the vertical axis 106 represent the difference score between the image whose frame number is aligned along the horizontal axis 108 with the respective plotted point and the preceding image frame (i.e., the image frame one position to the left) in captured image sequence 102 along the horizontal axis 108 of the graph 100.

As may now be appreciated, the greater the amount of difference between an image frame and its preceding image frame in captured image sequence 102, the larger the value of the difference score will be along the vertical axis 106 of graph 100. Several exemplary image frames have been called out for explanatory purposes. First, point 104a corresponds to the difference between captured frames 0 and 1. As is shown by the very low difference score, these two frames have a very high degree of similarity. Next, point 104b corresponds to the difference between captured frames 4 and 5. As is shown by the relatively large difference score, these two frames have a relatively high degree of difference, likely caused by the sudden appearance of the human subject in the foreground of frame 5. Next, point 104c corresponds to the difference between captured frames 15 and 16. As is shown by the relatively large difference score, these two frames have a relatively high degree of difference, likely caused by the sudden disappearance of the human subject from the foreground in frame 16. Finally, point 104d corresponds to the difference between captured frames 26 and 27. As is shown by the relatively moderate difference score, these two frames have a relatively moderate degree of difference, likely caused by the beginning of the reappearance of the human subject into the foreground in frame 27. Had the human subject taken up a larger portion of frame 27, the difference score for frame 27 would have been even larger.

As will be explained in further detail below, graph 100 of FIG. 1 represents the concept that sudden (and, often, unexpected) differences in the composition of the scene in images captured during a time-lapse video capture may cause large degrees of difference between adjacent captured image frames. When compressed into a time-lapse video, these abrupt differences can be jarring, and often do not "tell the story" that is intended by the creator of the time-lapse video. For example, the fact that a human subject walked into the foreground of a scene during several frames of a three hour time-lapse video capture of a sunset is likely not important (or desired) to be in the resultant time-lapse video of the sunset. Thus, what is needed is an intelligent way to discard such outlier or suboptimal frames from the generation of the resultant time-lapse video, while still maintaining a representative image frame from the captured sequence that was captured at or near the temporal point of interest of the discarded frame.

Figure 2:
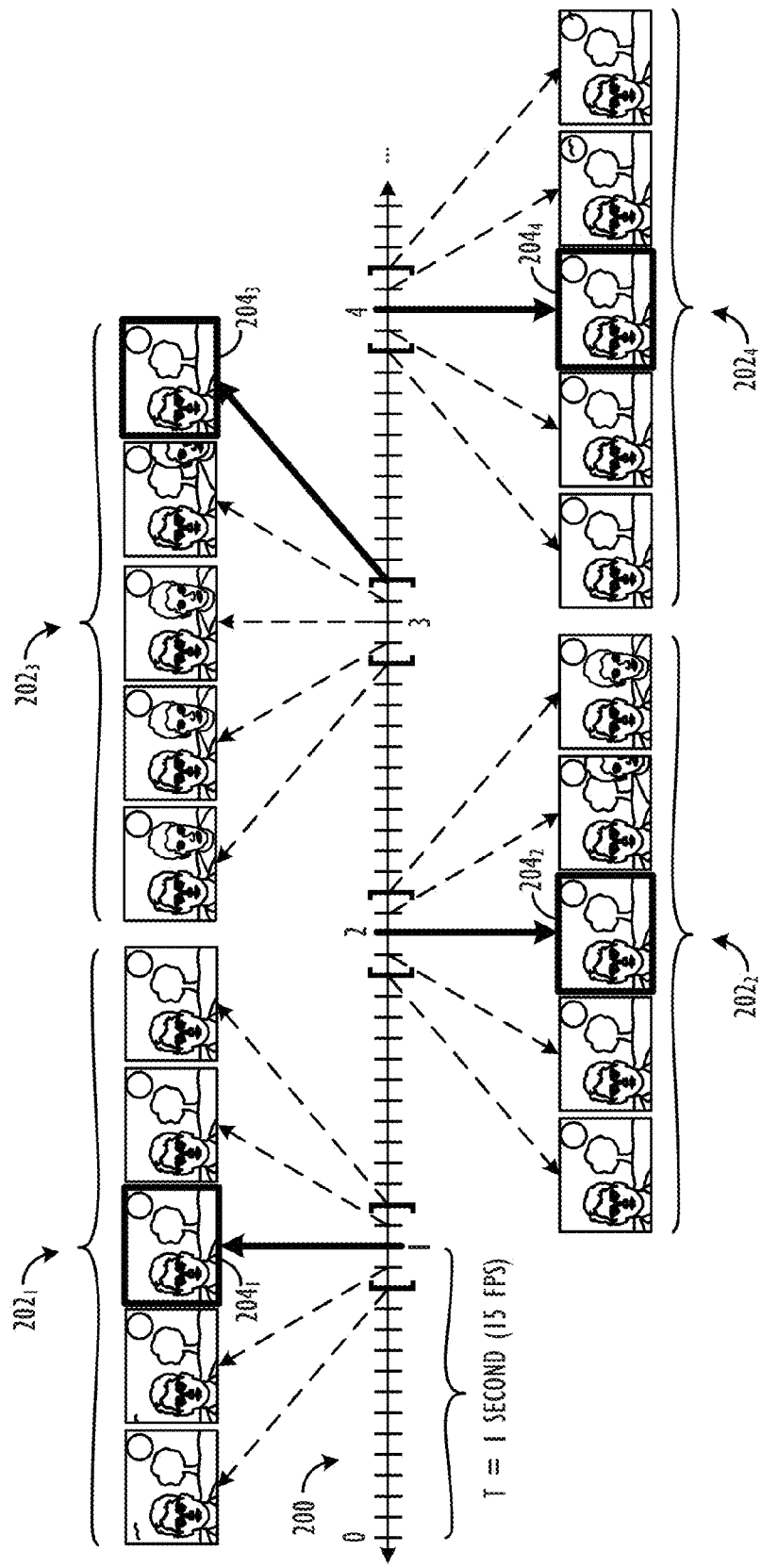
FIG. 2 is a timeline illustrating exemplary burst sequences of image frames captured around temporal points of interest, in accordance with one embodiment.

Referring now to FIG. 2, a timeline 200 illustrating exemplary burst sequences of image frames captured around temporal points of interest is shown, in accordance with one embodiment. As mentioned above, the illustrative embodiments described herein use an acquisition frame rate of 15 fps (i.e., 1 image every 66.6 ms), and temporal points of interest occur at 1 second intervals (i.e., t=1 s, 2 s, 3 s, etc.). [By capturing at 15 fps, rather than the traditional 30 fps—or even higher frame rates such as 60, 120, or 240 fps—the inventors have found that the camera firmware is often able to adjust the auto exposure (AE), auto focus (AF), auto white balance (AWB), and other parameters of the camera before the capture of the next image, thus allowing for smoother changes in exposure and coloration, and thereby eliminating some potential "outlier" image frames a priori, i.e., without ever capturing and storing them in the first place.] As shown in FIG. 2, there are four exemplary burst sequences: $202_1$, $202_2$, $202_3$, and $202_4$, centered around the first four temporal points of interest, occurring at t=1 s, t=2 s, t=3 s, and t=4 s, respectively, along timeline 200. Each of the four exemplary burst sequences: $202_1$, $202_2$, $202_3$, and $202_4$ comprise five captured image frames, centered around their respective temporal point of interest. With respect to the first temporal point of interest at t=1 s, the capture time of the five image frames in burst sequence $202_1$ would correspond to: 867 ms, 933 ms, 1 s, 1067 ms, and 1133 ms. The central image, $204_1$, in burst sequence $202_1$ is outlined in a thick black box, indicating that it is the "selected" or "flagged" image for burst sequence $202_1$. By default, the selected image for a given burst sequence will be the image that is used in the construction of the resultant time-lapse video.

As may be seen, the composition of the five image frames comprising burst sequence $202_1$ are very similar in composition, save for a bird flying over the head of the human subject in the first and second images. Such a situation may be common place in burst sequences such as exemplary burst sequence $202_1$, in which each of the images were captured during a 266 ms window. For longer burst sequences, lower acquisition frame rates, or more detailed/busy scenes, however, there may indeed be a great deal of dissimilarity among the image frames comprising the burst sequence, as will be discussed in further detail below.

Because burst sequence $202_1$ is the first burst sequence in the hypothetical video capture sequence shown in FIG. 2, there is no "preceding" selected frame to compare the frames in burst sequence $202_1$ against. In such a situation, the process may simply default to choosing the image frame in the center of the burst sequence $204_1$, i.e., the image frame that is centered on the temporal point of interest. Alternately, another measure, such a color composition, exposure, focus, or average luminance measure may be used to determine the first selected frame from the first burst sequence that is to be included in the resultant time-lapse video sequence.

Moving along timeline 200 to burst sequence $202_2$, it may be seen that the composition of the image frames in the burst sequence begins to change in the fourth and fifth frames of the sequence, as a second human subject appears to move in to the frame from the right hand side of the image. As explained in reference to FIG. 1, this would likely cause a greater degree of dissimilarity between the fourth and fifth images of burst sequence $202_2$ and the selected image $204_1$ from burst sequence $202_1$. As such, the process may again select the central image $204_2$ from burst sequence $202_2$ for inclusion in the resultant generated time-lapse video. Again, due to the high degree of similarity between the first three images in burst sequence $202_2$, the process may simply default to choosing the central image from burst sequence $202_2$ if it cannot ascertain significant differences in the similarity scores of the first three images in burst sequence $202_2$ as compared to the selected image $204_1$ from burst sequence $202_1$.

Moving along timeline 200 to burst sequence $202_3$, it may be seen that the composition of the image frames in the burst sequence includes both human subjects for the first three frames of burst sequence $202_3$, then the second human subject begins to move out of frame again by the fourth frame and then has exited the frame by the fifth and final frame of burst sequence $202_3$. As explained in reference to FIG. 1, this would likely cause a greater degree of dissimilarity between the first four images of burst sequence $202_3$ and the selected image $204_2$ from burst sequence $202_2$. As such, the process may select the fifth image $204_3$ from burst sequence $202_3$ for inclusion in the resultant generated time-lapse video. As may now be appreciated, the selection of image frames $204_1$, $204_2$, and $204_3$, will eliminate the appearance of the second human subject from the resultant time-lapse video altogether. This may be appropriate, as the second human subject appears to enter and exit the scene over only a single second during the capture of the time lapse video. In the context of a time-lapse video captured over a large length of time, it may be undesirable or jarring to have the face of the second human subject "pop" into the resultant time-lapse video for only a single frame and then never be seen again. Thus, using the techniques described herein, a better picture may be intelligently chosen around each temporal point of interest, yielding a better resultant time-lapse video. Finally, with reference to burst sequence $202_4$, it may be seen that the composition of each image frame in the burst sequence is similar to the selected image frame $204_3$, thus resulting in the process again selecting central frame $204_4$ for inclusion in the resultant time-lapse video.

According to some embodiments, it may also be possible to capture a "bracketed" exposure range of images for each image captured in the burst sequence, e.g., if there is a long enough delay interval between image acquisitions and/or if the image sensor being used is fast enough to employ such a behavior. The bracketed range of images captured at each capture point in the burst sequence could then be selected among in order to, e.g., better match exposure levels with a preceding selected image frame, serve as a "tie breaker" in the event that two or more images in a burst sequence had an equal similarity score with the selected image from the preceding burst sequence (e.g., select the bracketed image with the single, highest similarity score from among all of the bracketed captures of the two or more tied images in the burst sequence), or to allow exposure levels of images in the resultant time-lapse video sequence to adjust more gradually throughout the duration of the time-lapse video.

Figure 3:
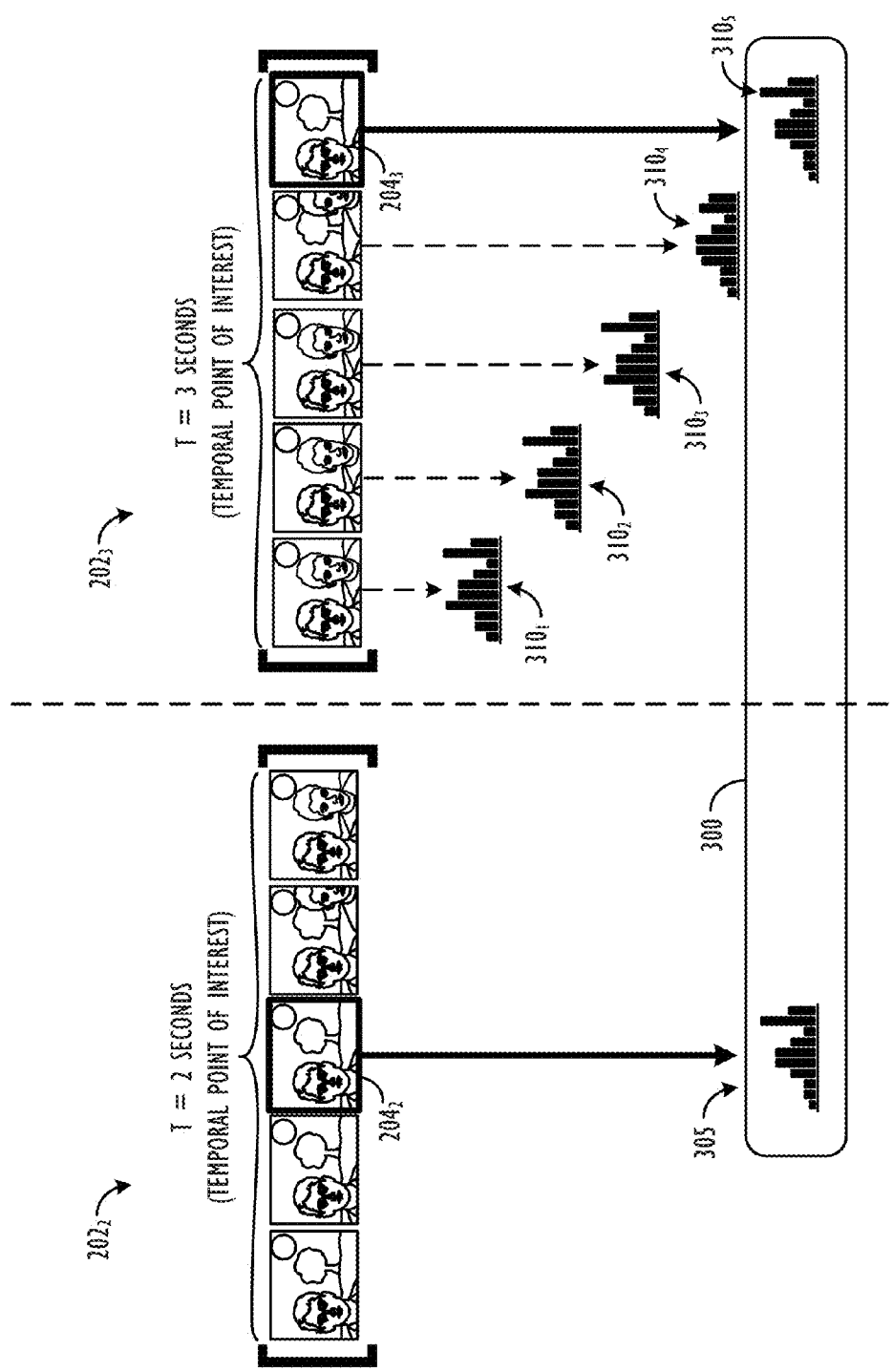
FIG. 3 illustrates the use of color histograms as an exemplary similarity measure between image frames from two different burst sequences of image frames captured around temporal points of interest, in accordance with one embodiment.

Referring now to FIG. 3, the use of color histograms as an exemplary similarity measure between image frames from two different burst sequences of image frames captured around temporal points of interest is shown, in accordance with one embodiment. According to some embodiments, the "similarity score" is determined by tiling each image that is being compared into eight bands and calculating image color histogram for each of the eight bands. Then, the image with the largest aggregate amount of histogram similarity across the eight bands (when compared to the selected image from the preceding temporal point of interest) would be deemed to be the most similar image from the burst sequence of image frames centered at the current temporal point of interest. As will be understood, other implementations could perform the similarity determination using, e.g., feature comparisons algorithms, registration algorithms, pixel sum algorithms, ΔE calculations, etc.

Histogram 305 represents an exemplary color histogram for selected image frame $204_2$ from burst sequence $202_2$. Histograms $310_1$-$310_5$ represent exemplary color histograms for each of the five images from exemplary burst sequence $202_3$. As may be seen, changes in the composition of the scene captured in a given image frame result in attendant changes to the image frame's color histogram. As explained above in reference to FIG. 2, according to some embodiments, the selected frame for a given burst sequence is chosen to be the image frame having the highest degree of similarity with the selected image frame from the preceding burst sequence. As depicted in FIG. 3 by the bounding box rectangle 300, the color histogram for the fifth image in burst sequence $202_3$ has the most similarity with the selected image frame $204_2$ from burst sequence $202_2$. As such, the fifth image in burst sequence $202_3$ is designated as the selected image frame $204_3$ to be used in the construction of the resultant time-lapse video sequence.

As mentioned above, there may be a strong dissimilarity between all the frames in a current burst sequence with the selected image from the previous burst sequence. In such a case, the method may simply pick one of the images automatically, such as defaulting to the center image of the burst sequence, i.e., the image frame that was captured most closely to the calculated temporal point of interest.

Figure 4:
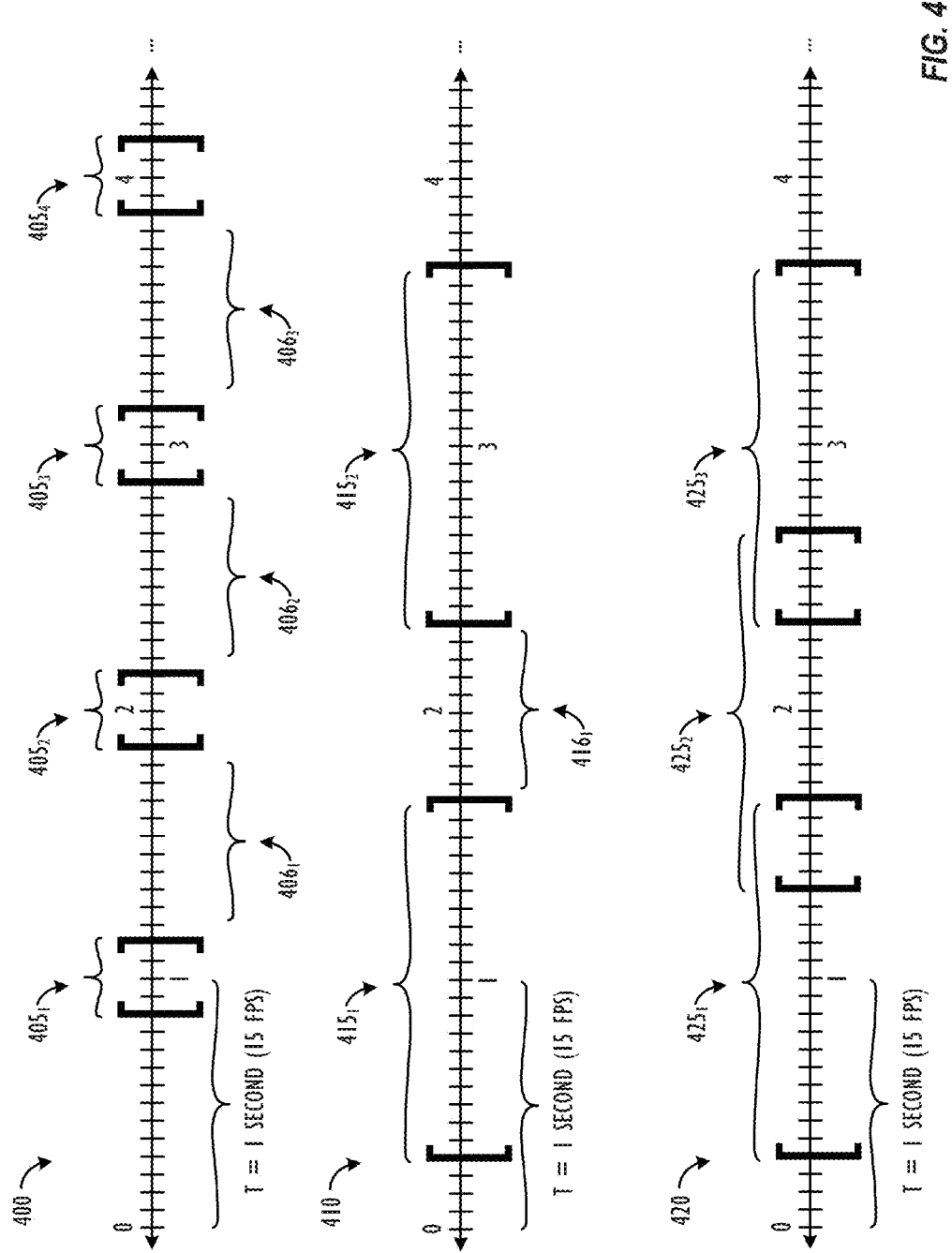
FIG. 4 illustrates exemplary burst sequences of image frames captured around temporal points of interest, in accordance with some embodiments.

Referring now to FIG. 4, exemplary burst sequences of image frames captured around temporal points of interest are shown, in accordance with some embodiments. As is shown in timeline 400, burst sequences 405 comprise five captured image frames each and are centered around temporal points of interest occurring every 1 second. This is similar to the example used in FIG. 2 above. As may be appreciated, this scheme leaves ten captured frames 406 in between every pair of temporal points of interest that are not a part of any captured burst sequence. As is shown in timeline 410, burst sequences 415 comprise twenty-one captured image frames each and are centered around temporal points of interest occurring every 2 seconds. As may be appreciated, this scheme leaves nine captured frames 416 in between every pair of temporal points of interest that are not a part of any captured burst sequence. Finally, as is shown in timeline 420, burst sequences 425 comprise twenty-one captured image frames each and are centered around temporal points of interest occurring every 1 second. As may be appreciated, this scheme results in consecutive burst sequences 425 overlapping, and not leaving any captured frames in between pairs of consecutive temporal points of interest that are not a part of any captured burst sequence. This example demonstrates that, the farther apart the burst sequences are in time, the larger the bursts of image frames can be without overlapping. The size of the burst sequences should, however, be balanced against becoming too large, as that may result in a situation wherein the first selected image is located at the left-hand side of a burst sequence and the next selected image is located at the right-hand side of the next burst sequence—resulting in a situation wherein two consecutive images in the resultant generated time-lapse video sequence were captured nearly two entire time intervals apart from one another.

According to some embodiments, an optional "dynamic weighting" scheme may also be applied to the image frames within a given burst sequence. For example, if there is a video capture where the constituent frames should be mostly the same (i.e., have high similarity scores) with the previous capture, then the process could start out by first taking away any outlier frames (e.g., frames where a bird flew in front of the camera) within a given burst sequence, and secondly, select the frame(s) that come the closest in color distribution, luminance, exposure, white balance, etc., to the preceding selected frame. However, in scenarios where the consecutive image frames in the video capture are not expected (or have not turned out to be) mostly the same (e.g., a time-lapse taken overlooking a crowded train station terminal), then the first step of discarding any outlier frames could be skipped, and the selection process could be based solely on color distribution, luminance, exposure, white balance, etc. to select the frame that is closest in composition to the preceding selected frame. In other embodiments, when a rapidly-changing scene, such as the crowded train station example, is detected or indicated by the user, the process may also limit its similarity comparison to just those regions of the image that haven't been rapidly changing from image to image.

In still other embodiments, a temporal weighting scheme may be employed as an additional factor in calculating the similarity score for a given image within a burst sequence of images. That is, image frames that occur closer to the temporal point of interest (i.e., closer to the center of the burst sequence) may have their similarity scores weighted more heavily than those image frames occurring farther from the temporal point of interest (i.e., closer to the edges of the burst sequence). In this way, when two images have a similar similarity score to one another, the process will default towards choosing the image that is closer to the actual temporal point of interest that the burst sequence is centered around.

Figure 5:
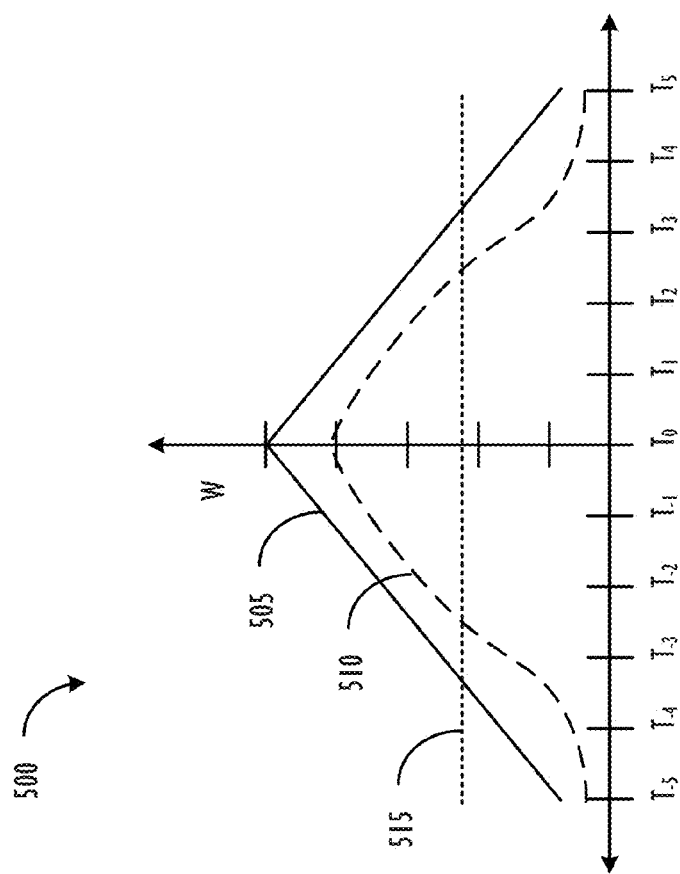
FIG. 5 illustrates exemplary temporal weighting schemes for burst sequences of image frames captured around temporal points of interest, in accordance with some embodiments.

Referring now to FIG. 5, a graph 500 of exemplary temporal weighting schemes 505/510/515 for burst sequences of image frames captured around temporal points of interest are shown, in accordance with some embodiments. Along the horizontal axis of graph 500, $t_0$ represents the image taken at the temporal point of interest, $t_1$-$t_3$ represent images taken subsequent to the temporal point of interest, and $t_{-1}$-$t_{-5}$ represent images taken prior to the temporal point of interest. The vertical axis of graph 500, W, represents the weight that will be applied to the similarity score of the corresponding image frame from the burst sequence. Weighting scheme 505 represents a scheme wherein a linear relationship is used to increase the weight of the image frame as it gets closer to the temporal point of interest, $t_0$. Weighting scheme 510 represents a scheme wherein a polynomial relationship is used to increase the weight of the image frame as it gets closer to the temporal point of interest, $t_0$. Weighting scheme 515 represents a scheme wherein a constant weight is applied to each image frame in the burst sequence. In such a scheme, temporal proximity to the point of interest does not factor into the similarity score determination. This may be appropriate with smaller burst sequences, since even the image frames captured at the very beginning and very end of the burst sequence are captured relatively close to the temporal point of interest.

Figure 6:
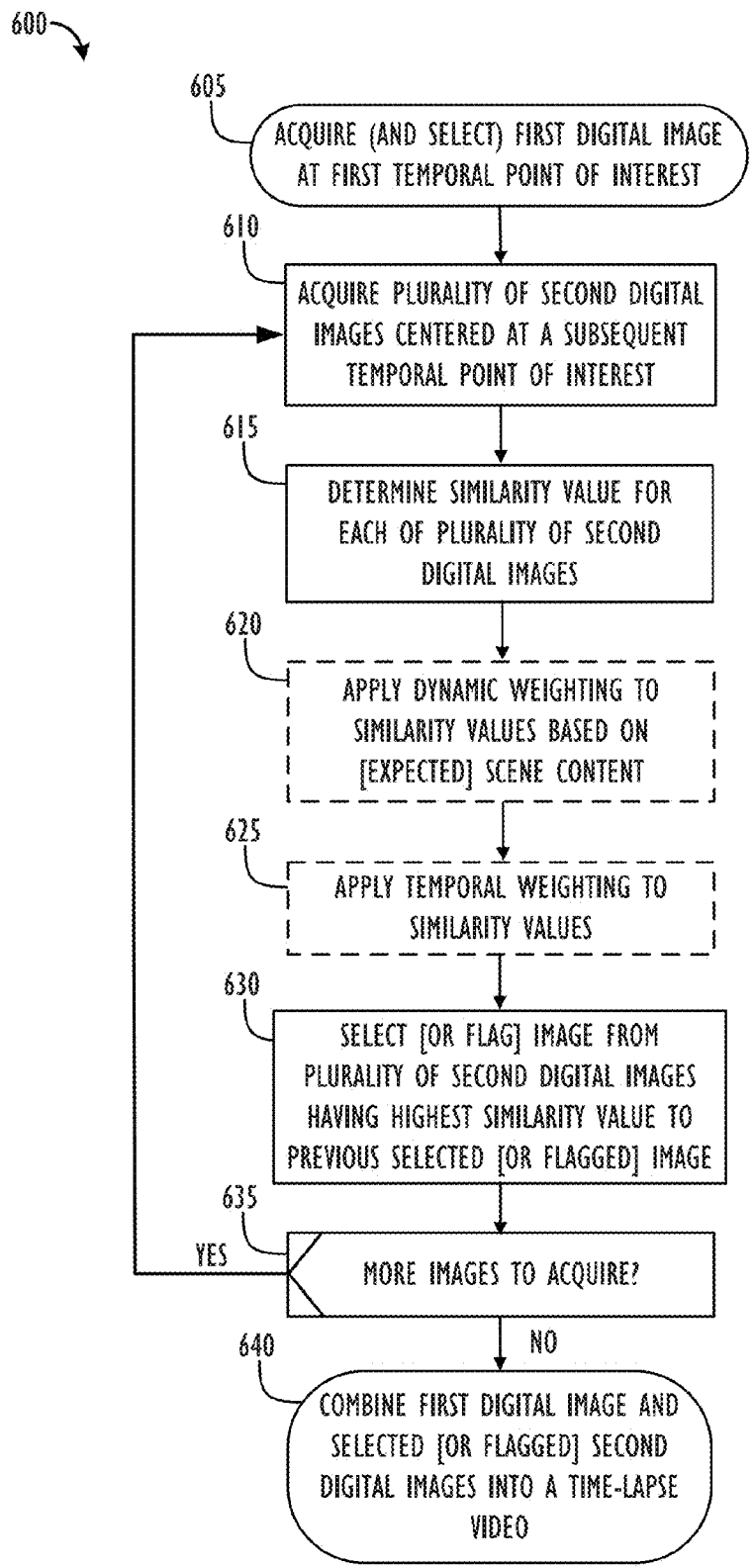
FIG. 6 is a flowchart illustrating a method of analyzing burst sequences of image frames centered around temporal points of interest in the construction of improved time-lapse videos, in accordance with one embodiment.

Referring now to FIG. 6, a flowchart 600 illustrating a method of analyzing burst sequences of image frames centered around temporal points of interest in the construction of improved time-lapse videos is shown, in accordance with one embodiment. First, the process may acquire (and, by default, select) a first digital image at a first temporal point of interest (Step 605). It is also possible to start the process by capturing a burst sequence of image frames, removing any "similarity outliers" from that first burst sequence, and then selecting the image frame with the sharpest focus, least noise, etc. Next, the process may acquire a plurality of second digital images centered at a subsequent temporal point of interest (Step 610). Next, the process may determine a similarity value for each of the plurality of second digital images, e.g., in accordance with any of the similarity measures that have been discussed herein (Step 615). Next, the process may optionally apply dynamic weighting schemes based on scene content (or expected scene content) (Step 620) and temporal weighting schemes (Step 625) to the similarity values of the plurality of second digital images.

Next, at Step 630 the process may select (or "flag") the particular image from the plurality of second images having the highest similarity value to the selected image frame from the previous selected or flagged image frame for inclusion into the resultant time-lapse video. Step 630 also allows the "non-selected" images to be discarded in an intelligent fashion. For example, if an image is determined to be an outlier or is otherwise "non-selected" based on its similarity score, that image can be flagged for deletion (rather than inclusion into the resultant time-lapse video). An image may be determined to be an outlier if, e.g., the camera is disturbed or obscured during image acquisition, or if there is a rapid and unexpected change in scene composition. Many techniques of implementing the flagging operation 630 will be apparent to the skilled artisan. According to an alternative embodiment, images that are flagged for deletion may not be immediately deleted. Rather, the flag(s) may be maintained with the images and embedded into the resulting output movie file, such that the flag(s) can be used to inform further video editing. For example, if the user wishes to change the decision made by the process at any particular temporal point of interest, he or she could use post-processing software programs to adjust the flags of the images from a particular burst sequence in order to change which image(s) is to be included in the resultant time-lapse video sequence.

If there are more images to acquire at Step 635, the process may return to Step 610 to capture the next plurality of second digital images centered at the next temporal point of interest. If, instead, there are no further images to acquire, the process may proceed to Step 640 and combine the first digital image with the second digital images that have been selected (or flagged) for inclusion into a time-lapse video.

Figure 7:
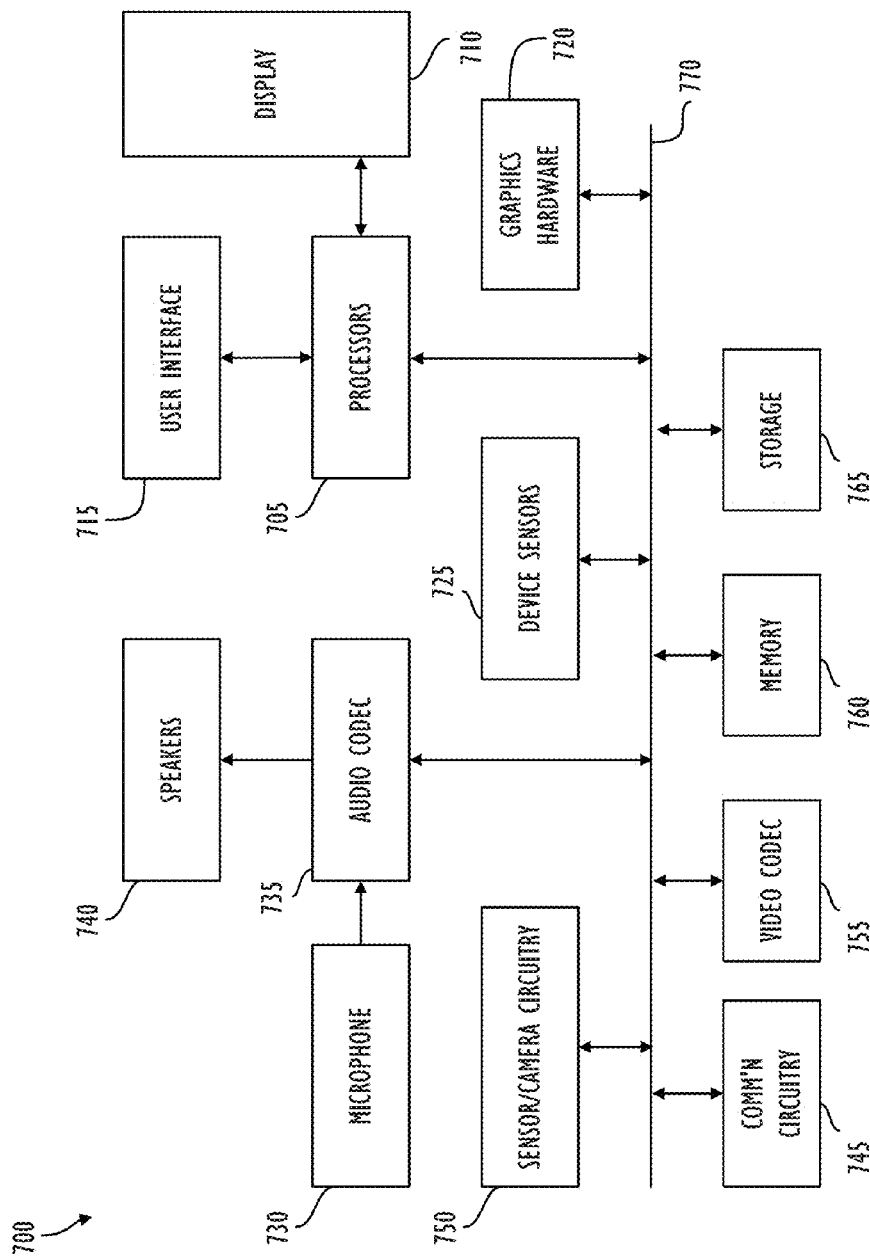
FIG. 7 illustrates a simplified functional block diagram of an illustrative electronic device, according to one embodiment.

FIG. 7 is a simplified functional block diagram of an illustrative electronic device, according to one embodiment. Electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture unit 750, video codec(s) 755, memory 760, storage 765, and communications bus 770. Electronic device 700 may be, for example, a personal digital assistant (PDA), personal music player, a mobile telephone, or a notebook, laptop or tablet computer system.

Processor 705 may execute instructions necessary to carry out or control the operation of many functions performed by device 700 (e.g., such as the generation and/or processing of time-lapse video in accordance with operation 100). Processor 705 may, for instance, drive display 710 and receive user input from user interface 715. User interface 715 can take a variety of forms, such as a button, keypad, dial, a click wheel, keyboard, display screen and/or a touch screen. Processor 705 may be a system-on-chip such as those found in mobile devices and include a dedicated graphics processing unit (GPU). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 process graphics information. In one embodiment, graphics hardware 720 may include a programmable graphics processing unit (GPU).

Sensor and camera circuitry 750 may capture still and video images that may be processed to generate images in accordance with this disclosure. Output from camera circuitry 750 may be processed, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705, graphics hardware 720, and image capture circuitry 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause one or more processing units to:
   acquire a first digital image from an image sensor at a first time;
   acquire a plurality of second digital images from the image sensor, wherein acquisition times of the plurality of second digital images are temporally centered around a determined second time;
   determine a similarity value for each of the plurality of second digital images, wherein the similarity values comprise an assessment of the similarity of a respective image from the second plurality of digital images and the first digital image;
   select, from the plurality of second digital images, a second digital image having the greatest similarity value; and
   combine the first digital image and the selected second digital image into a time lapse video.

2. The non-transitory program storage device of claim 1, wherein the similarity values are determined based, at least in part, on an evaluation of at least one of the following characteristics of a second digital image: a color histogram, an exposure level, a focus level, a feature detection process, an image registration process, a pixel sum process, a $\Delta E$ process, and an average luminance level.

3. The non-transitory program storage device of claim 1, wherein the instructions to select, from the plurality of second digital images, a second digital image having the greatest similarity value further comprise instructions to: delete each unselected digital image from the plurality of second digital images before causing the one or more processing units to combine the first digital image and the selected second digital image into a time lapse video.

4. The non-transitory program storage device of claim 1, wherein the instructions to select, from the plurality of second digital images, a second digital image having the greatest similarity value further comprise instructions to: delete each unselected digital image from the plurality of second digital images after causing the one or more processing units to combine the first digital image and the selected second digital image into a time lapse video.

5. The non-transitory program storage device of claim 1, wherein the number of digital images in the acquired plurality of second digital images is configurable.

6. The non-transitory program storage device of claim 1, further comprising instructions stored thereon to cause the one or more processing units to:
   weight at least one of the determined similarity values for a respective second digital image based, at least in part, on a content of the respective second digital image.

7. The non-transitory program storage device of claim 1, further comprising instructions stored thereon to cause the one or more processing units to:
   weight at least one of the determined similarity values for a respective second digital image based, at least in part, on a time of capture of the respective second digital image with respect to the determined second time.

8. A computer-implemented method, comprising:
   acquiring a first digital image from an image sensor at a first time;
   acquiring a plurality of second digital images from the image sensor, wherein acquisition times of the plurality of second digital images are temporally centered around a determined second time;
   determining a similarity value for each of the plurality of second digital images, wherein the similarity values comprise an assessment of the similarity of a respective image from the second plurality of digital images and the first digital image;
   selecting, from the plurality of second digital images, a second digital image having the greatest similarity value; and
   combining the first digital image and the selected second digital image into a time lapse video.

9. The method of claim 8, wherein the similarity values are determined based, at least in part, on an evaluation of at least one of the following characteristics of a second digital image: a color histogram, an exposure level, a focus level, a feature detection process, an image registration process, a pixel sum process, a $\Delta E$ process, and an average luminance level.

10. The method of claim 8, wherein the act of selecting, from the plurality of second digital images, a second digital image having the greatest similarity value further comprises: deleting each unselected digital image from the plurality of second digital images.

11. The method of claim 8, wherein the number of digital images in the acquired plurality of second digital images is configurable.

12. The method of claim 8, further comprising weighting at least one of the determined similarity values for a respective second digital image based, at least in part, on a content of the respective second digital image.

13. The method of claim 8, further comprising weighting at least one of the determined similarity values for a respective second digital image based, at least in part, on a time of capture of the respective second digital image with respect to the determined second time.

14. An electronic device comprising:
- an image sensor,
- a memory operatively coupled to the image sensor, and
- at least one processor operatively coupled to the memory and the image sensor, wherein the at least one processor is programmed to:
  - cause the camera to acquire a first digital image from an image sensor at a first time;
  - cause the camera to acquire a plurality of second digital images from the image sensor, wherein acquisition times of the plurality of second digital images are temporally centered around a determined second time;
  - determine a similarity value for each of the plurality of second digital images, wherein the similarity values comprise an assessment of the similarity of a respective image from the second plurality of digital images and the first digital image;
  - select, from the plurality of second digital images, a second digital image having the greatest similarity value; and
  - combine the first digital image and the selected second digital image into a time lapse video.

15. The electronic device of claim 14, wherein the similarity values are determined based, at least in part, on an evaluation of at least one of the following characteristics of a second digital image: a color histogram, an exposure level, a focus level, a feature detection process, an image registration process, a pixel sum process, a $\Delta E$ process, and an average luminance level.

16. The electronic device of claim 14, wherein the instructions to select, from the plurality of second digital images, a second digital image having the greatest similarity value that the at least one processor is programmed to perform further comprise instructions to: delete each unselected digital image from the plurality of second digital images before the at least one processor combines the first digital image and the selected second digital image into a time lapse video.

17. The electronic device of claim 14, wherein the instructions to select, from the plurality of second digital images, a second digital image having the greatest similarity value that the at least one processor is programmed to perform further comprise instructions to: delete each unselected digital image from the plurality of second digital images after the at least one processor combines the first digital image and the selected second digital image into a time lapse video.

18. The electronic device of claim 14, wherein the number of digital images in the acquired plurality of second digital images is configurable.

19. The electronic device of claim 14, wherein the at least one processor is further programmed to:
- weight at least one of the determined similarity values for a respective second digital image based, at least in part, on a content of the respective second digital image.

20. The electronic device of claim 14, wherein the at least one processor is further programmed to:
- weight at least one of the determined similarity values for a respective second digital image based, at least in part, on a time of capture of the respective second digital image with respect to the determined second time.

* * * * *